(12) United States Patent
Rogers et al.

(10) Patent No.: US 8,495,261 B2
(45) Date of Patent: Jul. 23, 2013

(54) REDISPATCHING SUSPENDED TASKS AFTER COMPLETION OF I/O OPERATIONS ABSENT I/O INTERRUPTS

(75) Inventors: Roger W. Rogers, Lagrangeville, NY (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 12/333,485

(22) Filed: Dec. 12, 2008

(65) Prior Publication Data

US 2010/0153605 A1    Jun. 17, 2010

(51) Int. Cl.
| G06F 3/00 | (2006.01) |
| G06F 5/00 | (2006.01) |
| G06F 13/24 | (2006.01) |
| G06F 12/00 | (2006.01) |
| G06F 13/00 | (2006.01) |
| G06F 9/26 | (2006.01) |
| G01R 31/08 | (2006.01) |

(52) U.S. Cl.
USPC .......... 710/48; 710/6; 710/7; 710/20; 710/39; 710/260; 711/133; 711/145; 711/170; 711/173; 711/207; 370/216

(58) Field of Classification Search
USPC ... 710/6, 46, 48, 100, 260; 711/171; 719/315; 370/216
See application file for complete search history.

(56) References Cited

U.S. PATENT DOCUMENTS

| 4,685,125 | A | * | 8/1987 | Zave ................................. 700/1 |
| 5,016,161 | A | * | 5/1991 | Van Loo et al. ............... 718/108 |
| 5,491,824 | A | * | 2/1996 | Koshi ........................... 710/244 |
| 5,566,338 | A | * | 10/1996 | Kodama et al. ............... 710/260 |
| 5,584,039 | A | * | 12/1996 | Johnson et al. .................... 710/6 |
| 5,671,365 | A | * | 9/1997 | Binford et al. ................ 710/100 |
| 5,710,909 | A | * | 1/1998 | Brown et al. .................. 711/170 |
| 5,758,184 | A | * | 5/1998 | Lucovsky et al. .................. 710/6 |
| 5,799,305 | A | * | 8/1998 | Bortvedt et al. ...................... 1/1 |
| 5,949,977 | A | * | 9/1999 | Hernandez .................... 709/229 |
| 6,058,426 | A | * | 5/2000 | Godwin et al. ............... 709/229 |
| 6,185,639 | B1 | * | 2/2001 | Kailash et al. .................. 710/48 |
| 6,223,207 | B1 | * | 4/2001 | Lucovsky et al. ............. 718/107 |
| 6,675,238 | B1 | * | 1/2004 | Coffman et al. ................ 710/46 |
| 6,697,959 | B2 | * | 2/2004 | Andress et al. ................. 714/10 |
| 6,718,413 | B1 | * | 4/2004 | Wilson et al. ................. 710/260 |
| 6,748,472 | B2 | * | 6/2004 | Knudsen ....................... 710/260 |
| 7,003,646 | B2 | * | 2/2006 | Roy et al. ...................... 711/171 |

(Continued)

OTHER PUBLICATIONS

"z/Architecture—Principles of Operation," IBM Ref. No. SA22-7832-06, Seventh Edition, Feb. 2008.

*Primary Examiner* — Idriss N Alrobaye
*Assistant Examiner* — Henry Yu
(74) *Attorney, Agent, or Firm* — Steven Chiu, Esq.; Kevin P. Radigan, Esq.; Heslin Rothenberg Farley & Mesiti P.C.

(57) ABSTRACT

Input/output (I/O) interrupts are avoided at the completion of I/O operations. A task requests (implicitly or explicitly) an I/O operation, and processing of the task is suspended awaiting completion of the I/O operation. At the completion of the I/O operation, instead of an I/O interrupt, an indicator associated with the task is set. Then, when the task once again becomes the current task to be executed, the indicator is checked. If the indicator indicates the I/O operation is complete, execution of the task is resumed.

17 Claims, 8 Drawing Sheets

U.S. PATENT DOCUMENTS

| | | | |
|---|---|---|---|
| 7,073,043 B2 * | 7/2006 | Arimilli et al. | 711/207 |
| 8,028,298 B2 * | 9/2011 | Moore | 719/315 |
| 2002/0136130 A1 * | 9/2002 | Turner et al. | 369/53.28 |
| 2004/0225850 A1 * | 11/2004 | Li et al. | 711/167 |
| 2005/0125793 A1 * | 6/2005 | Aguilar et al. | 718/100 |

* cited by examiner

REDISPATCHING SUSPENDED TASKS AFTER COMPLETION OF I/O OPERATIONS ABSENT I/O INTERRUPTS

TECHNICAL FIELD

This invention relates, in general, to facilitating processing within a processing environment, and in particular, to improving efficiency of the processing environment by avoiding I/O interrupts in particular situations.

BACKGROUND OF THE INVENTION

I/O interrupts are common in many processing environments that suspend processing waiting for required I/O operations to complete. Examples of such processing environments are those that have a limited amount of real memory, and therefore, take advantage of virtual memory. Virtual memory makes it seem as if there is more real memory in a system than really exists. With virtual memory, areas of real memory that have not been recently used are paged out to storage freeing up space in real memory.

In such virtual memory-based systems, a paging mechanism is used to share real memory resources with multiple executing tasks in a system. The virtual memory space is mapped onto the real memory space and the computer hardware uses this map to resolve virtual addresses into real addresses. Real memory resources are usually over committed in such an environment and, as previously stated, inactive portions of real memory are paged out to a device (usually a disk drive). The relevant areas are then marked as invalid. When a task requests data that has an address marked invalid, a page fault occurs causing an I/O interrupt for the task and suspending execution of the task. The virtual memory contents are then retrieved from the device. When the virtual memory page is once again resident in real memory, the task can resume execution.

The retrieval operation from the disk drive requires additional disruption of usable work due to the requirement of the operating system to acknowledge the completion of the disk I/O and to mark the virtual page available. This negatively impacts system performance.

SUMMARY OF THE INVENTION

Based on the foregoing, a need exists for a capability that eliminates the additional I/O interrupt to acknowledge completion of an I/O operation. In particular, a need exists for a capability that eliminates an I/O interrupt to indicate completion of an I/O operation and to mark a virtual page available. A need exists for a capability that allows an operating system to know when an I/O operation is complete enabling processing of a suspended task to be resumed. A need exists for a capability that allows an operating system to know when paging operations for a virtual memory page fault are complete without requiring the disruption and overhead of an I/O interrupt.

The shortcomings of the prior art are overcome and additional advantages are provided through the provision of a method of facilitating processing in a processing environment. The method includes, for instance, performing, by one or more components of the processing environment, an I/O operation for a task of the processing environment, wherein execution of the task has been interrupted; indicating completion of the I/O operation absent use of an I/O interrupt, wherein indicating completion includes setting, by a first processor of the processing environment, an indicator associated with task; and resuming, by a second processor of the processing environment, execution of the task, in response to an indication of completion, wherein the first processor may be the same or different from the second processor.

Systems and program products relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION OF THE INVENTION

In accordance with an aspect of the present invention, a capability is provided that avoids an I/O interrupt at completion of an I/O operation. In one example, a capability is provided that avoids an I/O interrupt at completion of an I/O operation to satisfy a page fault. A capability is provided that allows an operating system to know when paging operations for a page fault are complete without requiring the disruption and overhead of an I/O interrupt. A page fault is an interrupt that occurs when a task (i.e., an executable unit of work) requests data that is not currently in real memory. Although the term "page" is used herein, one or more aspects of the present invention are not limited to memory sizes of pages. The term page fault is to include a fault that causes an interrupt for any size of memory. Further, the size of memory requested need not be a page, but can be other sizes of memory.

Figure 1:
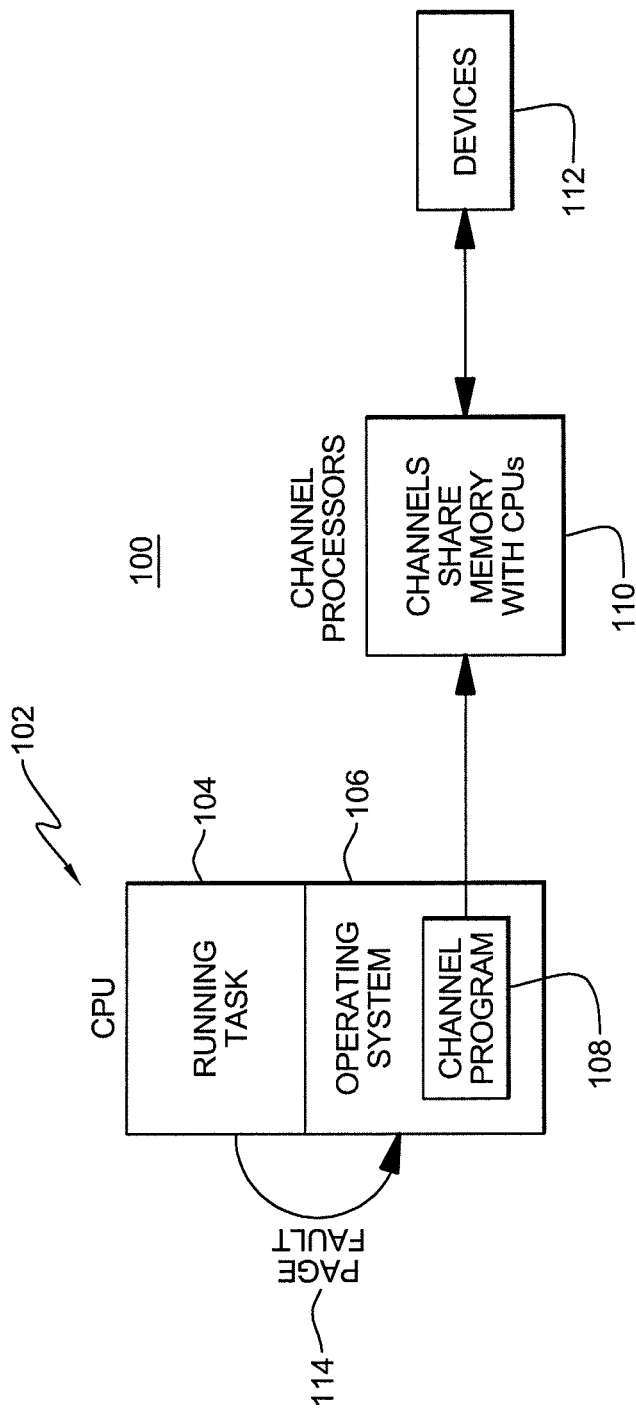
FIG. 1 depicts one example of a processing environment to incorporate and use one or more aspects of the present invention.

One embodiment of a processing environment to incorporate and use one or more aspects of the present invention is depicted in FIG. 1. In one example, a processing environment 100 is based on the z/Architecture®, offered by International Business Machines Corporation. z/Architecture® is described in, for instance, "z/Architecture—Principles of Operation," SA22-7832-06, Seventh Edition, February 2008, which is hereby incorporated herein by reference in its entirety. In particular, in one example, processing environment 100 includes a processor 102, such as a z/Series® processor (e.g., z10 server), executing one or more tasks 104 and an operating system 106 (e.g., the z/OS® operating system offered by International Business Machines Corporation). z/Architecture®, z/Series® and z/OS® are registered trademarks of International Business Machines Corporation, Armonk, N.Y. Other names used herein may be registered trademarks, trademarks or product names of International Business Machines Corporation or other companies.

Operating system 106 includes one or more channel programs (or other paging I/O segments) 108, which are fetched by one or more channel processors (also referred to herein as channels) 110 coupled to processor 102. The fetched channel programs are executed by the channel processors which, in one example, are subordinate or assist processors to central processor 102 and share memory with the central processing unit. The channel processors, when executing the channel programs, retrieve data from one or more devices 112, such as disk storage devices, solid state drives, or other storage devices.

When a task 104 attempts to access data that is not in real memory, a page fault 114 occurs. In response to the page fault, an interrupt occurs to enable the operating system to retrieve the virtual memory contents from a device. One embodiment of the logic associated with page fault processing is described with reference to FIG. 2. In this example, this processing is performed by the operating system.

Figure 2:
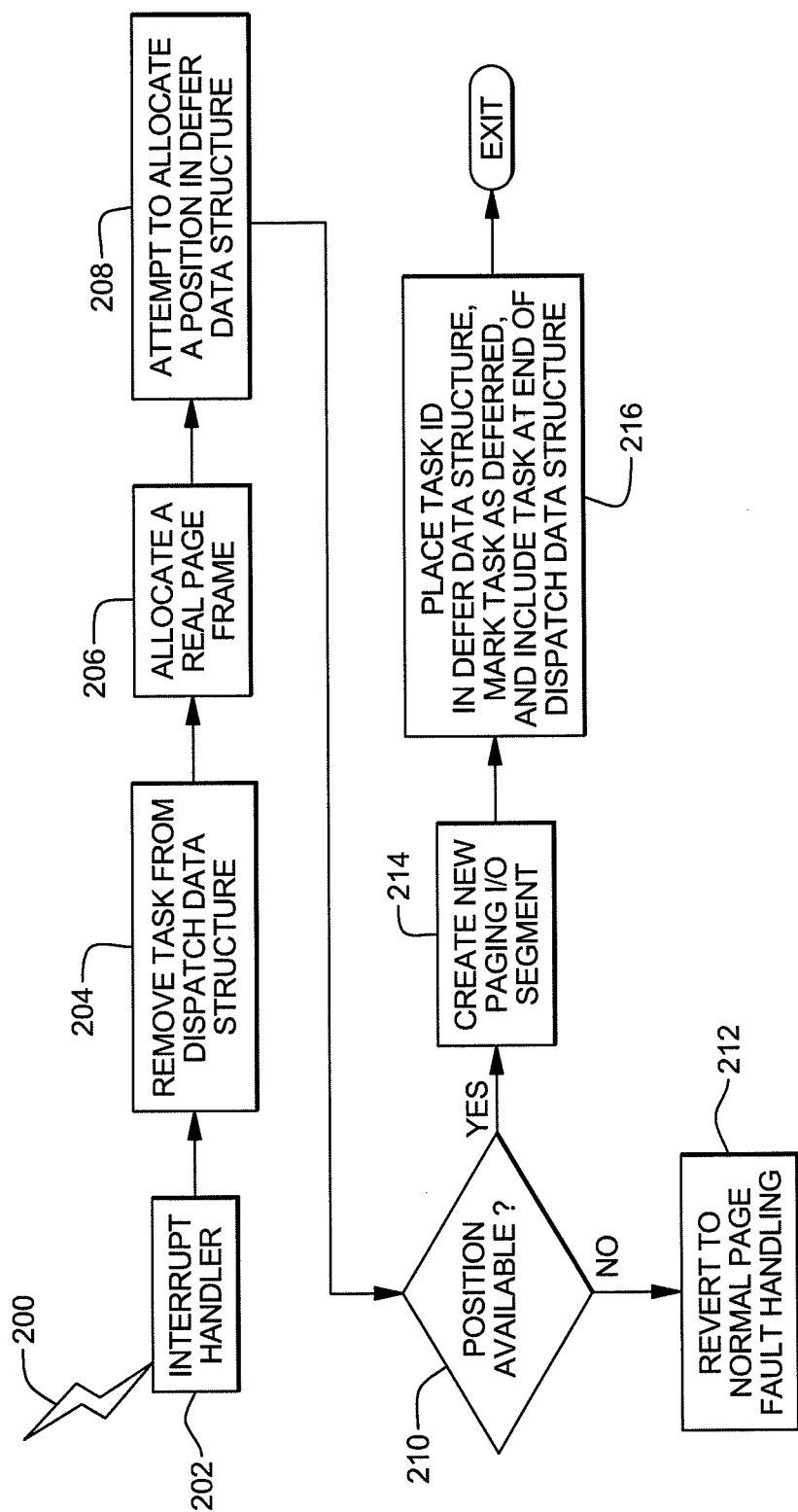
FIG. 2 depicts one embodiment of the logic associated with a page fault interrupt, in accordance with an aspect of the present invention.

Referring to FIG. 2, an interrupt 200 is provided, in response to a task attempting to access a unit of memory (e.g., a page) not resident in real memory. The interrupt is handled by an interrupt handler 202 of the operating system. As part of handling the interrupt, the executing task is removed from a dispatch data structure, STEP 204. This data structure may be a list, a queue or any other data structure that maintains one or more tasks to be dispatched.

Additionally, a real page frame is allocated, STEP 206. The real page frame holds the data in real memory when it is brought in from storage. The real page frame is allocated from a list of frames. Further, an attempt is made to allocate a position in a defer data structure, STEP 208. This data structure holds those tasks that have been deferred because of, for instance, a page fault.

Figure 3:
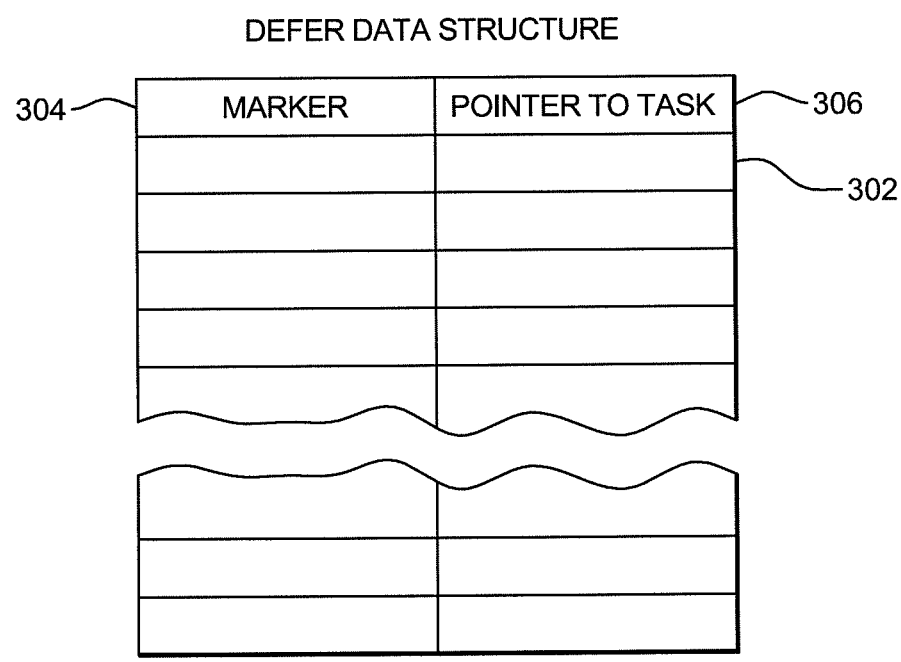
FIG. 3 depicts one example of a defer data structure used in accordance with an aspect of the present invention.

One example of a defer data structure is depicted in FIG. 3. The data structure can be a table, queue, list or any other desired structure stored in memory or external storage. As shown, a defer data structure 300 includes one or more entries 302. In one example, each entry 302 includes a marker 304, which indicates the state of the task, i.e., deferred or no longer deferred, and a pointer to the task 306. The defer data structure is initially initialized to indicate empty cells (e.g., each marker set to 01). Then, when a task is added, its marker is set to FF, as an example. When the task is ready, meaning that the I/O is complete, the marker is set to 00, in one embodiment. Although particular values for the markers are suggested, other values may be used without departing from the spirit of the present invention.

Returning to FIG. 2, in response to attempting to allocate a position in the defer data structure, a determination is made as to whether a position is available, INQUIRY 210. If a position is not available (i.e., the data structure is full), then processing reverts to normal page fault handling, STEP 212. However, if a position is available, then, in accordance with an aspect of the present invention, a new paging I/O segment (e.g., channel program) is created, STEP 214, in order to read the data from a device and reset the appropriate marker, as described below with reference to FIG. 4. In one example, the logic of FIG. 4 is performed by the operating system.

Figure 4:
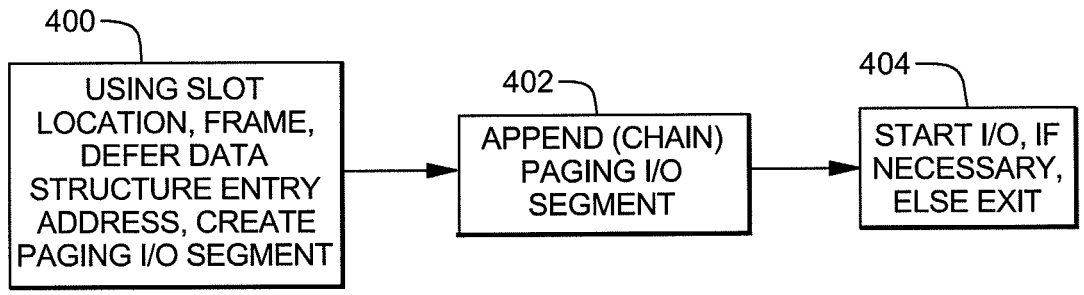
FIG. 4 depicts one embodiment of the logic to create a new paging I/O segment, in accordance with an aspect of the present invention.

Referring to FIG. 4, using a slot location on storage for the requested data, the allocated frame, and an address in the defer data structure of the entry in which the task will be added, a paging I/O segment is created, STEP 400. One example of a paging I/O segment is a channel program, described with reference to FIG. 5.

Figure 5:
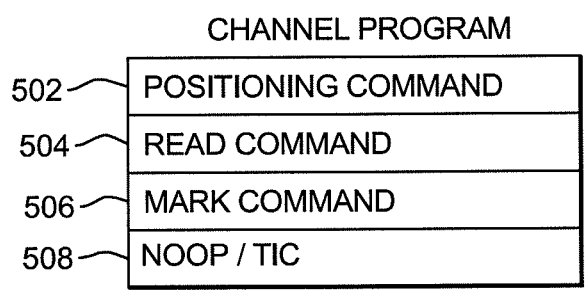
FIG. 5 depicts one example of a paging I/O segment (e.g., channel program) created in accordance with an aspect of the present invention.

Referring to FIG. 5, in one example, a channel program 500 includes a plurality of channel command words, each of which includes a particular command to be performed. As an example, channel program 500 includes, a positioning command 502 to position the media over the indicated slot; a read command 504 to read the data at the indicated slot into the specified frame; a mark command 506 to mark the appropriate entry in the defer data structure; and a NOOP command or TIC command 508 indicating an end of the channel program (NOOP) or a transfer in channel (TIC) to another channel program, respectively. The commands are executed by, for instance, a channel processor coupled to the processor executing the task.

Figure 6:
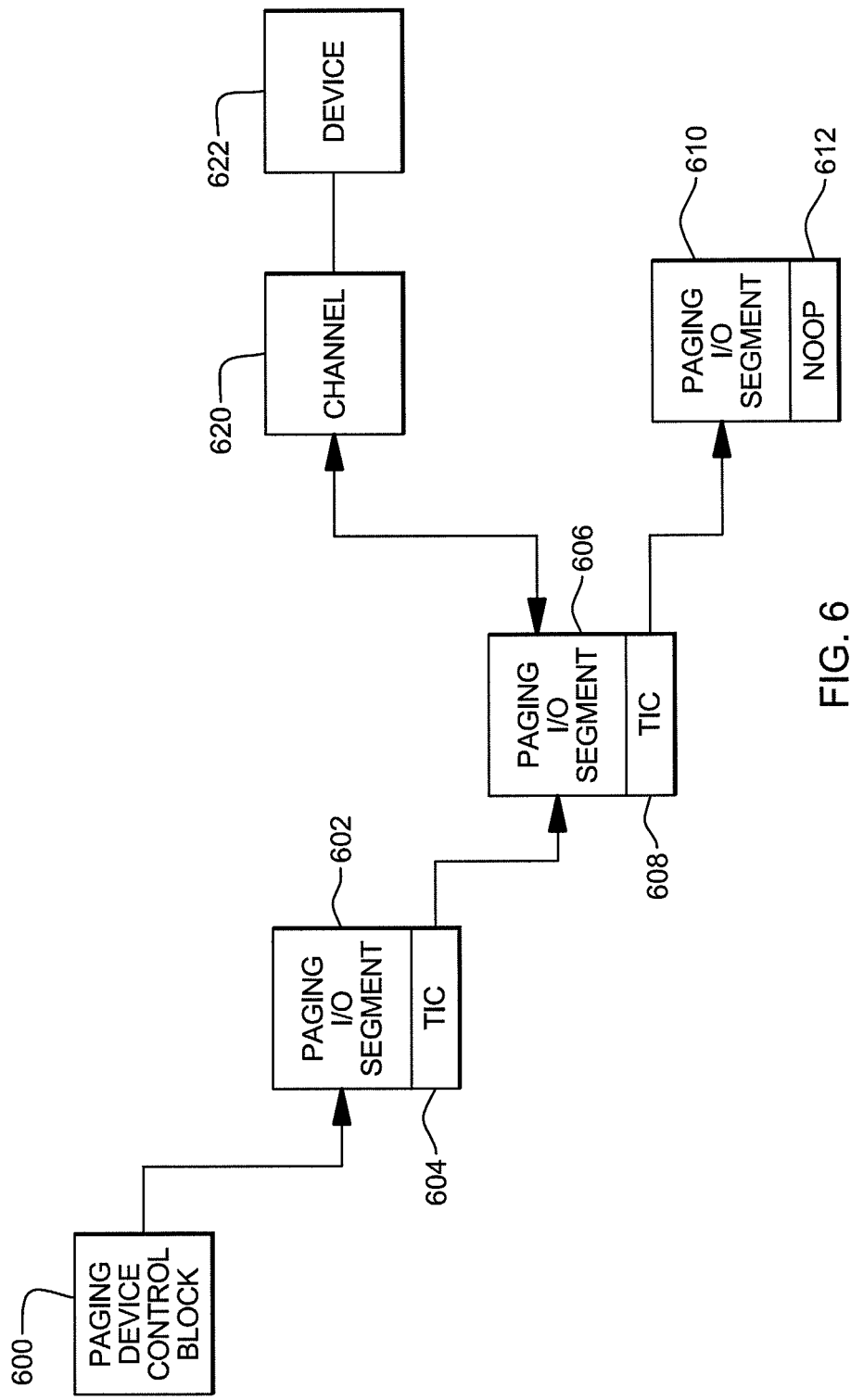
FIG. 6 depicts one example of chaining a plurality of paging I/O segments, in accordance with an aspect of the present invention.

Returning to FIG. 4, after creating the paging I/O segment, the paging I/O segment is appended to other paging I/O segments to be processed, STEP 402. For example, as shown in FIG. 6, in one embodiment, a paging device control block 600 points to a first paging I/O segment 602. The transfer in channel 604 within paging I/O segment 602 points to another paging I/O segment 606. Similarly, a transfer in channel 608 of paging I/O segment 606 points to yet another paging I/O segment 610. This paging I/O segment includes a NOOP indicator 612 specifying that this is the last paging I/O segment in the chain. A channel (or other component) 620 accesses the paging I/O segments, in order. In this example, paging I/O segment 606 is currently being accessed to execute the commands (e.g., channel commands) within the paging I/O segment. In response to the commands of the paging I/O segment, in this particular example, the channel accesses a device 622 to obtain the data that is to be read into the frame. When the data is read into the frame, the mark command sets the mark field to indicate the task is ready for dispatch, when its dispatch time arrives.

Although, in the above example, one channel and one device are indicated, it is understood that multiple channels (or other components) can be used to execute the commands, and that each channel has access to one or more devices. The devices accessed by a channel can be homogeneous or heterogeneous. Many types of devices can be used.

Returning to FIG. 4, after appending the paging I/O segment to the chain of paging I/O segments, processing continues with starting I/O, if necessary, STEP 404. This step is executed, if, for instance, the entire chain has been executed, and a new chain is to be executed.

Returning to FIG. 2, subsequent to creating the new paging I/O segment, the task id of the task receiving the page fault is placed in the defer data structure and the associated marker is set to indicate the task is deferred, STEP 216. Additionally, the task is placed at the end of the dispatch data structure, and the task has a flag indicating that it is deferred. This flag can be any type of indicator. The flag specifies that the status of the task is to be checked (in the defer data structure) prior to dispatching the task. If the task does not include this flag, then the defer structure is not checked. This concludes the interrupt processing.

In parallel to the interrupt handling processing described above, dispatch processing is also taking place. One embodiment of this processing is described with reference to FIG. 7. In one example, this processing is performed by a dispatcher within the operating system.

Figure 7:
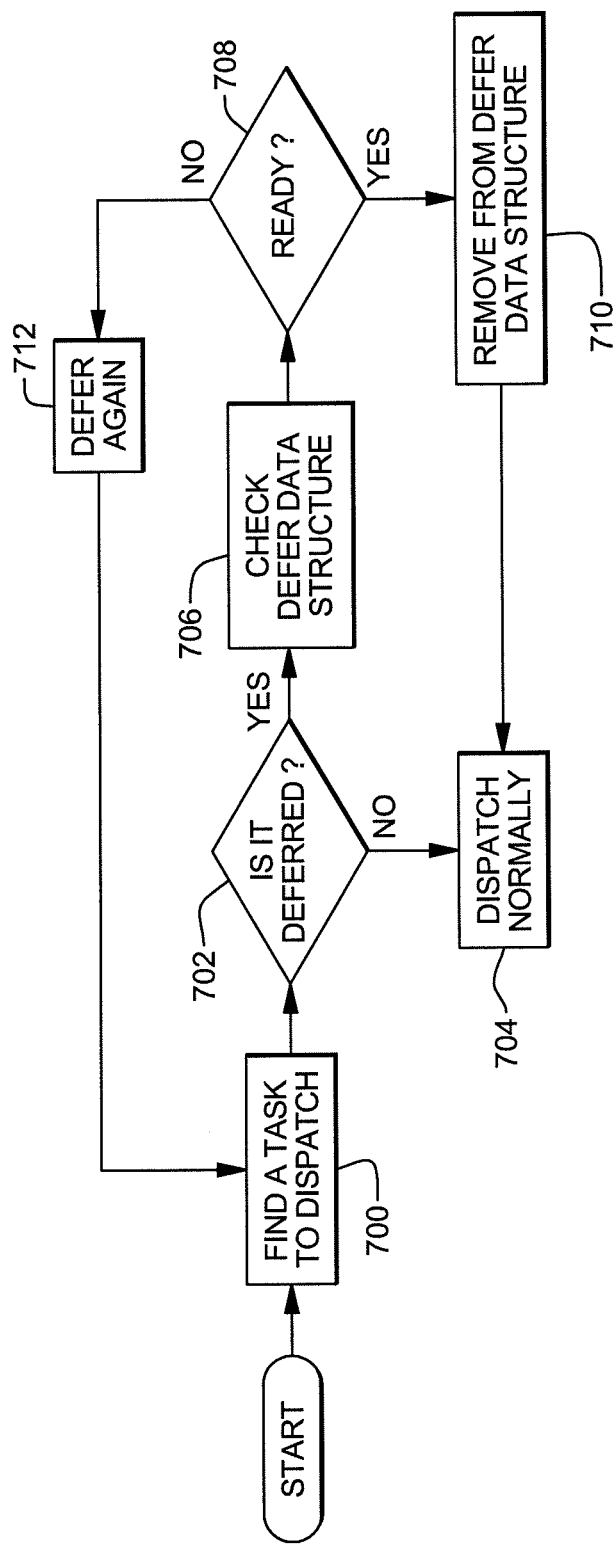
FIG. 7 depicts one embodiment of the logic for dispatch processing, in accordance with an aspect of the present invention.

Referring to FIG. 7, initially, the dispatcher selects a task to dispatch, STEP 700. In one example, this includes selecting a task off of the dispatch data structure. A determination is made as to whether this task is deferred, STEP 702. In one example, this determination is made by looking at the flag associated with the task. If the task is not deferred, then dispatching is performed as normal, STEP 704. However, if the task is deferred, then the defer data structure is checked to determine the current status of the task, STEP 706. In one example, a hashing technique is used to access the appropriate entry. However, other techniques may also be used. If the task is ready to be dispatched, as indicated by its status in the defer data structure, INQUIRY 708, then it is removed from the defer data structure, STEP 710, and dispatched, STEP 704. Use of this status indicator in the defer data structure enables completion of an I/O operation to be indicated, absent use of an I/O interrupt.

Returning to INQUIRY 708, if the task is not ready to be dispatched, then it is deferred again, STEP 712, by adding it to the end of the dispatch data structure. Processing then continues with STEP 700.

In a further embodiment, instead of using a defer data structure, a field within the existing task structure or control block is marked as deferred for paging operation. This mark is placed in a specific location within the structure or control block and includes the marker value (for example, xFFFFFFFF).

As described above, in response to a page fault, processing of a task is deferred until the page fault is handled. However, at the completion of the page fault, instead of an I/O interrupt, an indicator associated with the task is set specifying that the data is available and the task can now be dispatched. The indicator is set by a component of the processing environment, such as by a channel processor executing the commands; or in an example in which the indicator is included in a structure of the task (e.g., control block) by the operating system of the processor. Other components may also be used.

In one example, it is assumed that a high percentage of I/O will complete in a certain time and that the interrupted process can be re-dispatched at that point. There is low overhead in handling the case where the I/O did not complete. There is also low overhead in re-dispatching the process at a time later than the expected time. Therefore, there is a net increase in performance by eliminating the interrupt at the end of the I/O.

Although the examples describe avoiding I/O interrupts at completion of I/O operations, in response to a page fault, one or more aspects of the present invention are applicable to avoiding I/O interrupts at the completion of I/O for reasons other than page faults, and these are considered a part of the claimed invention.

Figure 8:
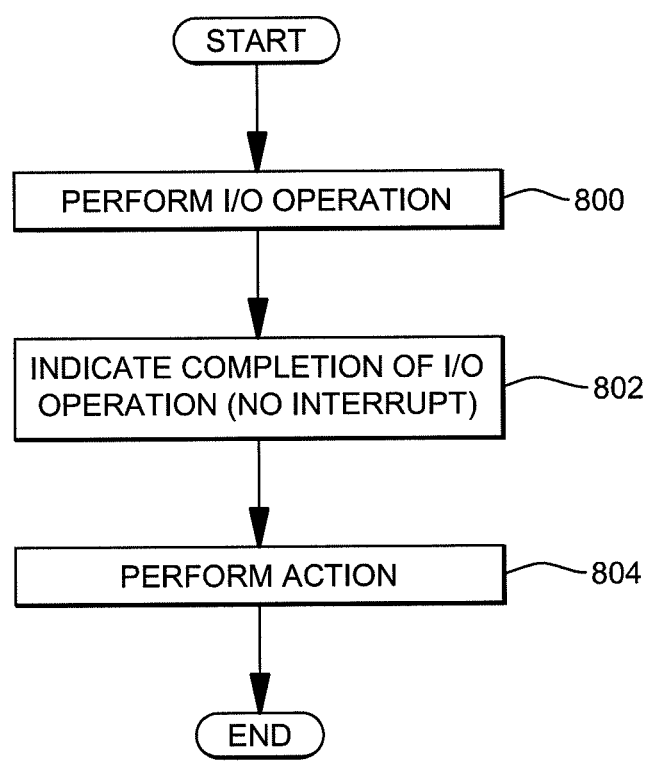
FIG. 8 depicts one embodiment of the logic to indicate completion of an I/O operation without use of an I/O interrupt to indicate the completion, in accordance with an aspect of the present invention.

With reference to FIG. 8, in one embodiment of the present invention, an I/O operation is performed by one or more components of a processing environment, such as a processor (e.g., a channel processor), an I/O device, and/or a combination thereof, STEP 800. In one example, the I/O operation is performed for a task of the processing environment wherein execution of that task has been interrupted. The I/O operation may be performed for the task based on an implicit request of the task or an explicit request. When the I/O operation is complete, completion of the I/O operation is indicated without performing an interrupt, STEP 802. In one example, completion of the I/O operation is indicated by setting an indicator associated with the task. This indicator may be included in a task structure, such as a control block of the task, and set by, for instance, the operating system executing on a central processor; or within a defer data structure, as described above, and set by, for instance, a channel processor, other subordinate processor or the central processor, as examples. Thereafter, an action is performed, in response to the indication of completion, STEP 804. As an example, the action to be performed includes resuming execution of the task. Execution of the task is resumed, for instance, in response to checking the indicator at specified times and learning that the I/O operation has been completed. In one example, it is the operating system on the central processor that resumes execution. This concludes processing.

Although in the above examples, particular processors or other components are specified as performing a function, other processors or components can also perform those functions without departing from the spirit of the present invention.

One or more aspects of the present invention can be included in an article of manufacture (e.g., one or more computer program products) having, for instance, computer readable media. The media has therein, for instance, computer readable program code means or logic (e.g., instructions, code, commands, etc.) to provide and facilitate the capabilities of the present invention. The article of manufacture can be included as a part of a computer system or sold separately.

Figure 9:
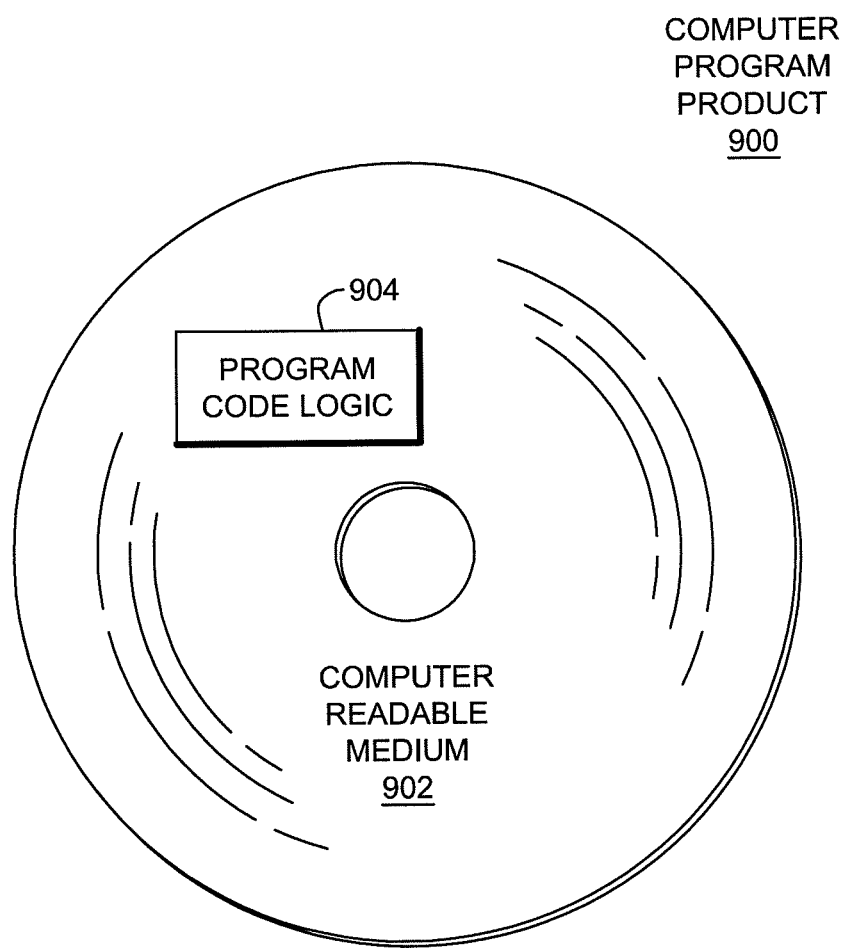
FIG. 9 depicts one embodiment of a computer program product incorporating one or more aspects of the present invention.

One example of an article of manufacture or a computer program product incorporating one or more aspects of the present invention is described with reference to FIG. 9. A computer program product 900 includes, for instance, one or more computer usable media 902 to store computer readable program code means or logic 904 thereon to provide and facilitate one or more aspects of the present invention.

The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a capability is provided that eliminates an I/O interrupt at the completion of an I/O. As one example, the I/O interrupt at the completion of an I/O used to acknowledge such completion and to mark a virtual page available is eliminated. This enhances system performance by allowing an operating system to know when paging operations for a virtual memory page fault are complete without requiring the disruption and overhead of an I/O interrupt.

Although various embodiments are described above, these are only examples. Many variations may be made without departing from the spirit of the present invention. For example, redispatching of the interrupted task can be handled in a manner different than described above. In one embodiment, the faulted task, while task switched out, is kept in the queue of dispatchable processes. In this embodiment, the level of system activity will ensure that with high probability the fault will be resolved by the time this task is redispatched.

If the fault is not resolved by this time, then the original page fault occurs a second time. If a second page fault occurs, the task can be treated in one of two ways. It can be reappended to the end of the dispatch list or removed from the dispatch list to a list to wait for an interruption indicating the return of the page, as examples.

As a further example, instead of automatically attempting to redispatch a task when it comes to the head of the dispatch queue (after being deferred), timestamps and a tunable parameter are used to determine when a redispatch of the task is to be attempted. For instance, when the task is deferred, a defer timestamp is provided for the task (e.g., in a control block associated with the task, in the dispatch data structure, in the defer data structure, etc.) that indicates the beginning of the defer, and then when the task is the next task to be dispatched, the defer timestamp is compared to current time. If the difference is less than a tunable parameter, then the task would still be deferred. Otherwise, the task is attempted to be redispatched, including, for instance, checking the defer data structure to see if the I/O is complete and redispatching, if I/O is complete.

The tunable parameter can be set to any desired value. The setting may depend on the type of storage devices being used. For example, for conventional disk storage, it may be set to 10-15 milliseconds; for faster storage, it may be set to 1 millisecond. It may also be set to zero or any other desired value. It can be set automatically or manually based on rules or set by an operator.

When, based on the tunable parameter, the task is ready to be checked for redispatch, the dispatch may be attempted at that time or at a later time. For instance, the task may be placed at the end of the dispatch queue, and redispatched later. As a further example, all the tasks ready to be redispatched, based on the tunable parameter, may be redispatched, in response to invoking the operating system or dispatcher for one or more reasons. In that case, when the operating system or redispatcher is invoked it checks for any tasks in which redispatching is past due.

Yet further, instead of checking the tunable parameter when the task comes up in the queue, it may be checked at a predefined time, in which all the deferred tasks (or a subset thereof) are checked. Many other variations are possible.

Additionally, environments other than those based on the z/Architecture® may incorporate and use one or more aspects of the present invention. The central processor may be executing an operating system other than z/OS®. Further, the environment may include more than one central processor and the processors may be homogeneous or heterogeneous. Yet further, the environment can be other than a mainframe environment. Further, the paging I/O segments can be other than channel programs and a device other than a channel processor may execute the paging I/O segments. Channels other than z/Architecture® channels, such as SCSI or other channels, can use one or more aspects of the present invention. Different types of devices may be used to store the data. Further, the data structures described herein can be of a different format, length or include different information than described herein. Further, the examples of values used to mark entries of the defer data structure can be different than described herein. Moreover, the dispatch data structure and defer data structure can be one structure, and the deferred tasks are just marked as deferred in that one structure. Many other variations also exist.

Moreover, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of facilitating processing in a processing environment, said method comprising:
    responsive to occurrence of a page fault associated with a data request of a task currently executing, suspending execution of the task, indicating the task as being currently suspended for page fault processing, and placing the suspended task at an end of a dispatch structure of tasks ready for execution by a processor;
    performing, by one or more components of the processing environment, a page fault operation for the suspended task, wherein the suspended task remains on the dispatch structure during performance of the page fault operation for the suspended task;
    based on retrieving data to satisfy the page fault, indicating completion of the page fault operation by setting, by a first processor of the processing environment, a completion indicator associated with the suspended task, the completion indicator indicating that execution of the suspended task may be resumed based on identifying the suspended task as potentially next for dispatching from the dispatch structure; and
    performing dispatching of tasks from the dispatch structure, wherein at least one suspended task for which an operation has yet to be completed remains on the dispatch structure while at least one other task on the dispatch structure is selected for potentially resuming execution thereof, and wherein the performing comprises:
        responsive to identifying, on the dispatch structure, the suspended task as potentially next for execution, checking prior to dispatching of the suspended task, the completion indicator associated with the suspended task to determine whether the completion indicator is set indicating completion of the page fault operation, and, based on the checking indicating completion of the page fault operation, dispatching the suspended task from the dispatch structure to a second processor of the processing environment, to resume execution of the suspended task, wherein the first processor may be the same or different from the second processor.

2. The method of claim 1, wherein the completion indicator is included in a field of a task structure of the task.

3. The method of claim 1, wherein the completion indicator is included in an entry of a defer data structure, said entry corresponding to the task.

4. The method of claim 1, wherein indicating the task as being currently suspended for page fault processing comprises indicating a defer status of the task within an entry of the dispatch structure, the defer status indicating that the completion indicator associated with the task is to be checked when the task is selected for potential dispatch for execution, wherein identifying the task currently suspended for page fault processing comprises selecting the task for potential dispatch for execution from the dispatch data structure, checking the defer status of the task to determine whether the completion indicator associated with the task is to be checked, and wherein checking the completion indicator associated with the task is performed responsive to the defer status indicating that the completion indicator associated with the task is to be checked.

5. The method of claim 4, wherein the completion indicator is included in an entry of a defer data structure, and wherein the indicating completion of the page fault operation comprises indicating within the defer data structure that the task is available for dispatching for resuming execution thereof.

6. The method of claim 5, wherein the indicating that the task is available for dispatching is performed by a command of paging segment, in response to completion of a read command of the paging segment.

7. The method of claim 1, wherein the task resumes execution subsequent to indication of completion that the task is available for execution and in response to the task becoming a next task to be dispatched for execution.

8. The method of claim 1, wherein the one or more components comprises at least one of a channel processor and a device.

9. The method of claim 1, wherein the first processor comprises a channel processor or a central processor, and the second processor comprises the central processor.

10. The method of claim 1, wherein the task resumes execution subsequent to indication of completion and in response to an indication of being ready to be redispatched, said indication of being ready being based on a tunable parameter.

11. A computer system for facilitating processing in a processing environment, said computer system comprising:
    a memory; and
    at least one processor, in communications with the memory, wherein the computer system is configured to perform a method comprising:
        responsive to occurrence of a page fault associated with a data request of a task currently executing, suspending execution of the task, indicating the task as being currently suspended for page fault processing, and placing the suspended task at an end of a dispatch structure of tasks to ready for execution by a processor;
        performing, by one or more components of the processing environment, a page fault operation for the suspended task, wherein the suspended task remains on the dispatch structure during performance of the page fault operation for the suspended task;
        based on retrieving data to satisfy the page fault, indicating completion of the page fault operation by setting, by a first processor of the processing environment, a completion indicator associated with the suspended task, the completion indicator indicating that execution of the suspended task may be resumed based on identifying the suspended task as potentially next for dispatching from the dispatch structure; and
        performing dispatching of tasks from the dispatch structure, wherein at least one suspended task for which an operation has yet to be completed remains on the dispatch structure while at least one other task on the dispatch structure is selected for potentially resuming execution thereof, and wherein the performing comprises:
            responsive to identifying, on the dispatch structure, the suspended task as potentially next for execution, checking prior to dispatching of the suspended task, the completion indicator associated with the suspended task to determine whether the completion indicator is set indicating completion of the page fault operation, and, based on the checking indicating completion of the page fault operation, dispatching the suspended task from the dispatch structure to a second processor of the processing environment, to resume execution of the suspended task, wherein the first processor may be the same or different from the second processor.

12. The computer system of claim 11, wherein the completion indicator is included in a field of a task structure of the task or in an entry of a defer data structure, said entry corresponding to the task.

13. The computer system of claim 11, wherein indicating the task as being currently suspended for page fault processing comprises indicating a defer status of the task within an entry of the dispatch structure, the defer status indicating that the completion indicator associated with the task is to be checked when the task is selected for potential dispatch for execution, wherein identifying the task currently suspended for page fault processing comprises selecting the task for potential dispatch for execution from the dispatch data structure, checking the defer status of the task to determine whether the completion indicator associated with the task is to be checked, and wherein checking the completion indicator associated with the task is performed responsive to the defer status indicating that the completion indicator associated with the task is to be checked.

14. The system of claim 11 wherein the task resumes execution subsequent to indication of completion that the task is available for execution and in response to the task becoming a next task to be dispatched for execution.

15. A computer program product for facilitating processing in a processing environment, the computer program product comprising:
 a non-transitory computer readable storage medium readable by a processor and storing instructions for execution by the processor to perform a method comprising:
 responsive to occurrence of a page fault associated with a data request of a task currently executing, suspending execution of the task, indicating the task as being currently suspended for page fault processing, and placing the suspended task at an end of a dispatch structure of tasks ready for execution by a processor;
 performing, by one or more components of the processing environment, a page fault operation for the suspended task, wherein the suspended task remains on the dispatch structure during performance of the page fault operation for the suspended task;
 based on retrieving data to satisfy the page fault, indicating completion of the page fault operation by setting, by a first processor of the processing environment, a completion indicator associated with the suspended task, the completion indicator indicating that execution of the suspended task may be resumed based on identifying the suspended task as potentially next for dispatching from the dispatch structure; and
 performing dispatching of tasks from the dispatch structure, wherein at least one suspended task for which an operation has yet to be completed remains on the dispatch structure while at least one other task on the dispatch structure is selected for potentially resuming execution thereof and wherein the performing comprises:
 responsive to identifying on the dispatch structure the suspended task as potentially next for execution, checking prior to dispatching of the suspended task, the completion indicator associated with the suspended task to determine whether the completion indicator is set indicating completion of the page fault operation, and, based on the checking indicating completion of the page fault operation, dispatching the suspended task from the dispatch structure to a second processor of the processing environment, to resume execution of the suspended task, wherein the first processor may be the same or different from the second processor.

16. The computer program product of claim 15, wherein indicating the task as being currently suspended for page fault processing comprises indicating a defer status of the task within an entry of the dispatch data structure, the defer status indicating that the completion indicator associated with the task is to be checked when the task is selected for potential dispatch for execution, wherein identifying the task currently suspended for page fault processing comprises selecting the task for potential dispatch for execution from the dispatch data structure, checking the defer status of the task to determine whether the completion indicator associated with the task is to be checked, and wherein checking the completion indicator associated with the task is performed responsive to the defer status indicating that the completion indicator associated with the task is to be checked.

17. The article of manufacture of claim 15, wherein the task resumes execution subsequent to indication of completion that the task is available for execution and in response to the task becoming a next task to be dispatched for execution.

* * * * *